(12) United States Patent
Suuronen

(10) Patent No.: US 10,113,917 B2
(45) Date of Patent: Oct. 30, 2018

(54) SYSTEM AND METHOD FOR IN SITU TEMPERATURE MEASUREMENT

(71) Applicant: Varian Semiconductor Equipment Associates, Inc., Gloucester, MA (US)

(72) Inventor: David E. Suuronen, Newburyport, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 285 days.

(21) Appl. No.: 14/934,652

(22) Filed: Nov. 6, 2015

(65) Prior Publication Data
US 2017/0131154 A1    May 11, 2017

(51) Int. Cl.
*G01K 7/00*    (2006.01)
*G01K 7/16*    (2006.01)

(52) U.S. Cl.
CPC .......... *G01K 7/16* (2013.01); *G01K 2217/00* (2013.01)

(58) Field of Classification Search
USPC ................................................. 318/634, 641
See application file for complete search history.

(56) References Cited

U.S. PATENT DOCUMENTS

| | | | | |
|---|---|---|---|---|
| 3,779,079 A | * | 12/1973 | Snook | G01K 7/01 374/145 |
| 7,768,269 B2 | * | 8/2010 | Pipitone | C23C 14/3471 204/298.03 |
| 7,949,233 B2 | * | 5/2011 | Chiang | G06F 1/206 318/400.08 |
| 2004/0188021 A1 | * | 9/2004 | Mitrovic | H01L 21/67248 156/345.52 |
| 2008/0192405 A1 | * | 8/2008 | Purohit | H01L 21/6833 361/234 |
| 2014/0324372 A1 | | 10/2014 | Suuronen et al. | |

* cited by examiner

*Primary Examiner* — Lisa Caputo
*Assistant Examiner* — Nasir U Ahmed
(74) *Attorney, Agent, or Firm* — Nields, Lemack & Frame, LLC

(57) ABSTRACT

A system and method for monitoring the temperature of a platen and a workpiece disposed on that platen is disclosed. Since the platen is a dielectric material, its properties, such as resistivity and conductivity, may change as a function of temperature. By understanding the relationship between these parameters and temperature, it may be possible to indirectly determine the temperature of the platen. For example, the platen may be in electrical communication with a power supply, which provides a clamping voltage for the workpiece. By monitoring the current waveform associated with the clamping voltage, it is possible to determine changes in the characteristics of the platen. Based on these changes, the temperature of the platen may be calculated.

12 Claims, 6 Drawing Sheets

SYSTEM AND METHOD FOR IN SITU TEMPERATURE MEASUREMENT

Embodiments of the present disclosure relate to a system and method for in situ temperature measurement, and more particularly, in situ temperature measurement of a platen and workpiece in a semiconductor fabrication system.

BACKGROUND

Semiconductor devices may be fabricated by implanting ions into a workpiece disposed on a platen. Traditionally, ion implants were performed at room temperature. However, more recently, it has been found that certain ion implant techniques may be improved if the temperature at which the ion implant is performed is elevated. For example, in certain embodiments, the ion implant may be performed at a temperature in excess of 500° C.

However, one issue associated with ion implants at elevated temperatures is monitoring the temperature of the platen or workpiece during the ion implant process. Various measurement techniques have been used. For example, specialized workpieces with integrated temperature sensors can be disposed on the platen to measure actual temperature. However, this technique uses valuable system time, which increases the cost of ownership, only provides data regarding the test workpiece, and is not a real time measurement.

Other attempts to measure temperature include the use of infrared to attempt to create a thermal map of the workpiece while the workpiece is being processed. However, thermal imaging with infrared may be difficult to interpret. Interpretation is often performed by one with specialized experience. In a semiconductor fabrication environment, such a person may or may not be available. In any event, the time for interpretation adds time to the total fabrication process.

Therefore, it would be beneficial if there was a system and method of determining the temperature of a platen and workpiece, while that workpiece is being processed by an ion beam. Further, it would be advantageous if this system and method could be incorporated into existing systems with minimal changes and provide feedback about the platen and workpiece temperature during implant to the semiconductor fabrication system.

SUMMARY

A system and method for monitoring the temperature of a platen and a workpiece disposed on that platen is disclosed. Since the platen is made of a dielectric material, its properties, such as resistivity and conductivity, can change as a function of temperature. By understanding the relationship between these properties and temperature, it has been discovered that it is possible to indirectly determine the temperature of the platen and workpiece during the implantation process. For example, the platen may be in electrical communication with a power supply, which provides a clamping voltage for the workpiece. By monitoring the clamping current waveform associated with the clamping voltage, it is possible to determine changes in the properties of the platen and workpiece. Based on these changes, it is possible to determine the temperature of the platen and the workpiece.

According to one embodiment, a system for determining a temperature of a platen is disclosed. The system comprises a platen comprising at least one electrode; a power supply to provide a clamping voltage and a clamping current to the at least one electrode; a current sensor to monitor clamping current; and a controller configured to determine a temperature of the platen based on a parameter of the clamping current. In certain embodiments, the clamping voltage is a time-varying voltage. In other embodiments, the clamping voltage is a constant voltage. In certain embodiments, the current sensor outputs a clamping current waveform to the controller. In certain embodiments, the parameter comprises an area under a curve of the clamping current waveform. In other embodiments, the parameter is a measure of the leakage current through a dielectric layer of the platen. In certain embodiments, the controller is further configured to determine the temperature based on an equation. In certain embodiments, the controller is further configured to determine the temperature based on a table.

According to another embodiment, a system for monitoring a temperature of a platen is disclosed. The system comprises a platen, comprising a dielectric material and having one or more electrodes disposed therein; a power supply to provide a clamping voltage and a clamping current to the one or more electrodes; a current sensor to monitor the clamping current; a heating system to supply a heating current to one or more heating elements disposed in or near the platen; and a controller configured to determine a temperature of the platen based on a parameter of the clamping current, wherein the temperature determined by the controller is used by the heating system to optimize a temperature of the platen. In certain embodiments, the temperature determined by the controller is compared to an expected temperature to detect an impending failure. In certain embodiments, the temperature determined by the controller is used by the heating system to ramp up or ramp down the temperature of the platen. In certain embodiments, the temperature determined by the controller is used by the heating system to maintain a desired temperature of the platen.

According to another embodiment, a system for determining a temperature of a platen is disclosed. The system comprises a power supply to provide a clamping voltage to one or more electrodes disposed in a platen, wherein the power supply outputs a clamping current waveform to produce the clamping voltage; and a controller configured to determine a temperature of the platen based on a parameter of the clamping current waveform. In certain embodiments, the clamping voltage is a constant voltage and the parameter comprises leakage current through a dielectric layer of the platen. In certain embodiments, the clamping voltage is a time-varying voltage and the parameter comprises an area under a curve of the clamping current waveform.

BRIEF DESCRIPTION OF THE FIGURES

For a better understanding of the present disclosure, reference is made to the accompanying drawings, which are incorporated herein by reference and in which.

DETAILED DESCRIPTION

When a workpiece is disposed on a platen, the workpiece is typically held in place by a clamping force. This clamping force may be electrostatic in nature. For example, the platen may be in communication with a power supply, which provides a clamping voltage to the platen. One or more electrodes may be disposed in the interior of the platen. These electrodes are in communication with the power supply. The clamping voltage, i.e. the electrical charge, applied to the electrodes creates an electric field, which serves to clamp the workpiece to the platen throughout the processing of the workpiece.

The clamping voltage may be a time-varying voltage (i.e. an AC voltage which may be at a fixed or a varying frequency) or may be a constant voltage (i.e. a DC voltage). As is well known, the power supply outputs a clamping current corresponding to the target clamping voltage. This clamping current is a function of the clamping voltage and the impedance of the platen and electrodes. For example, if the platen and electrodes present a purely resistive load, the clamping current waveform would mirror the shape of the clamping voltage waveform, since the clamping current would simply be defined as the voltage divided by the resistance.

However, the platen and the electrodes do not present a purely resistive load. Rather, these components present a complex impedance that may have, by design, inductance, capacitance, and resistance. Further, the impedance of the platen and electrodes varies as a function of temperature, which changes the clamping current waveform. This change in clamping current waveform can be used to determine the temperature of the platen.

Figure 1:
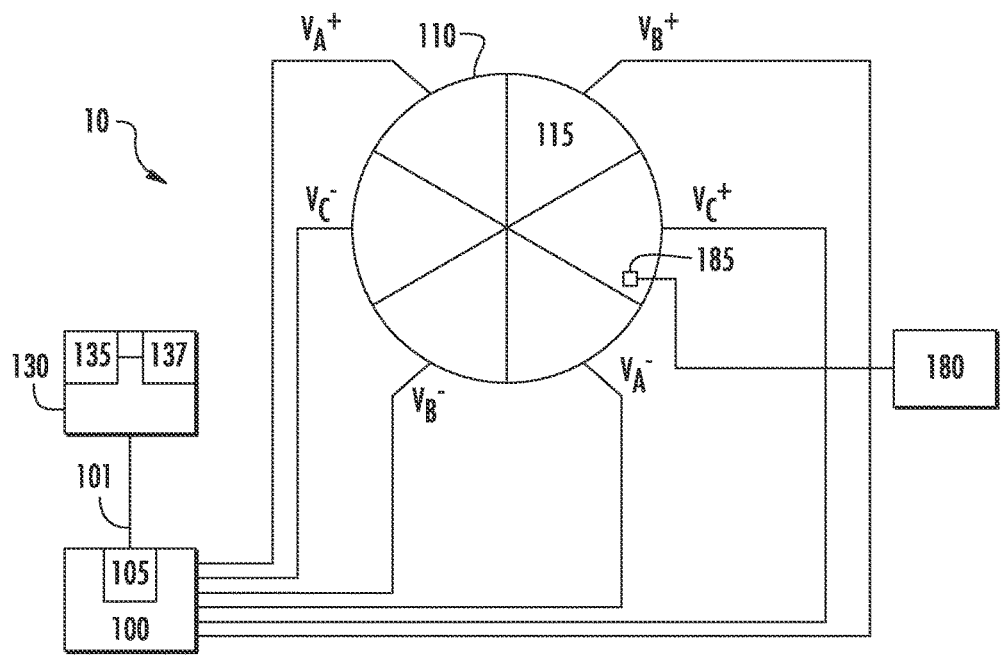
FIG. 1 is a system with in situ temperature monitoring according to one embodiment.

FIG. 1 shows a system 10 with in situ temperature monitoring according to one embodiment. In this embodiment, a power supply 100 is in communication with electrodes 115 disposed within a platen 110. The platen 110 may be made of a dielectric material, such as, but not limited to, silica types of glass, ceramic and other materials known for the fabrication of electrostatic clamps. The electrodes 115 are disposed within the interior of the dielectric material. The platen 110 may also have a base, which may be made of a thermally conductive material.

The electrodes 115 are made of an electrically conductive material and are embedded in the dielectric material that serves as the top surface of the platen 110. As one example, in the embodiment of FIG. 1, the electrodes 115 are configured as three sets of electrodes, where each set of electrodes comprises two electrodes. Other geometric arrangements, such as but not limited to interdigitated configurations, are possible. The same clamping voltage is applied to each set of electrodes 115; however, the two electrodes in each set are 180° out of phase with one another.

In other words, each set of electrodes has two clamping voltages. The clamping voltages applied to the first set of electrodes are referred to as $V_A^+$ and $V_A^-$. Similarly, the clamping voltages applied to the second set of electrodes are referred to as $V_B^+$ and $V_B^-$, while the clamping voltages for the third set of electrodes are $V_C^+$ and $V_C^-$. Each set of electrodes 115 is supplied with the same clamping voltage, however, the phase of the clamping voltage can vary. For example, $V_B^+$ may have a 120° phase offset, compared to $V_A^+$, where the phase offset between adjacent electrodes 115 may be calculated as 360°/N, where N is the number of sets of electrodes.

The power supply 100 may include a current sensor 105. The current sensor 105 may monitor the current output by the power supply 100 and provide an output 101, indicative of the clamping current being supplied to the electrodes 115. This output 101 may be provided to a controller 130. This output 101 may be indicative of the total clamping current supplied to all of the electrodes, or to a subset of the electrodes 115, or to only one electrode 115.

The controller 130 may include a processing unit 135 and a memory device 137 in communication with the processing unit 135. The processing unit 135 may be any suitable component, such as a microcontroller, a personal computer, or a specialized device. The memory device 137 may be a non-transitory storage device and may be used to store instructions and data. For example, the instructions to perform the processes described herein may be stored in the memory device 137. In addition, the memory device 137 may include data, tables, algorithms or other formulas to perform the processes described herein. These processes may provide information feedback to the semiconductor fabrication system.

The controller 130 may process this output 101 and determine a temperature of the platen 110, and the workpiece disposed on the platen 110, based on the output 101. The controller 130 may use a variety of algorithms to calculate the temperature, as described below.

Heating system 180 may be responsible for supplying a current to heating elements 185 disposed in or near the platen 110. These heating elements are used to heat the platen 110 to a desired temperature. Typically, the current supplied to the heating elements is based on a table or another source of empirical data.

Figure 2:
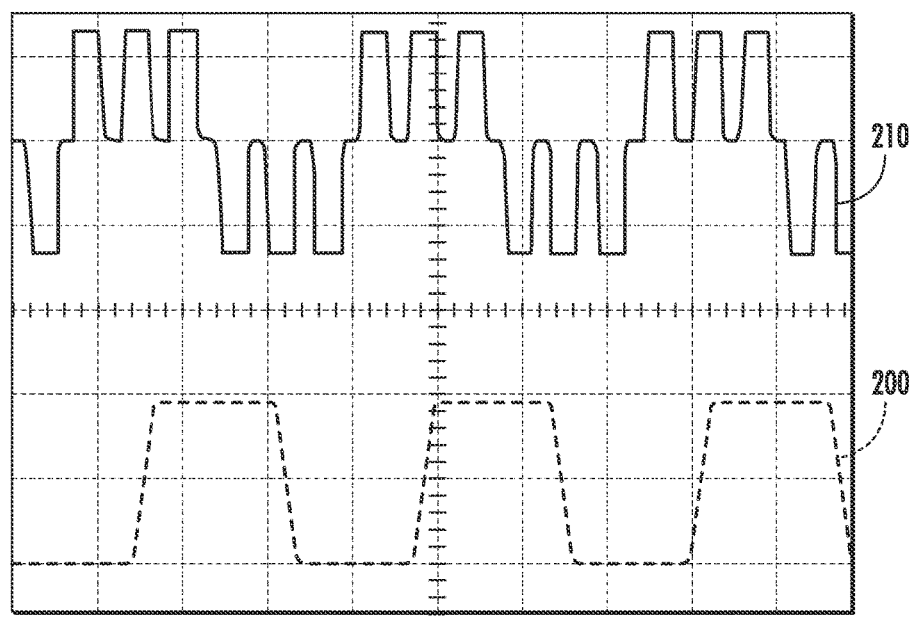
FIG. 2 shows a representative clamping current waveform and clamping voltage waveform supplied by the power supply to the platen.

FIG. 2 shows the clamping waveforms. Line 200 is a representative clamping voltage waveform provided by the power supply 100 to one of the electrodes 115. Line 210 shows the clamping current waveform associated with the clamping currents provided to all of the electrodes. In the embodiment of FIG. 1, there are three pairs of electrodes. Thus, six current waveform signatures are seen in the clamping current waveform (line 210) for each period of the clamping voltage waveform (line 200). Each current waveform signature is associated with a transition of the clamping voltage supplied to one set of electrodes 115. Although not shown, line 210 may be replaced with a clamping current waveform that is provided to one electrode 115 or one set of electrodes.

Figure 3A:
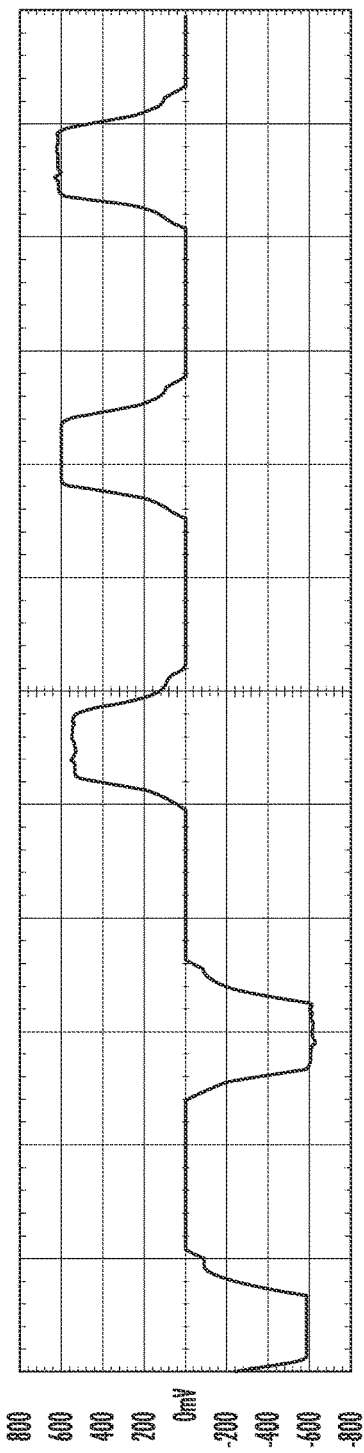
FIG. 3A shows a clamping current waveform supplied by the power supply at a first temperature when there is no workpiece disposed on the platen.
Figure 3B:
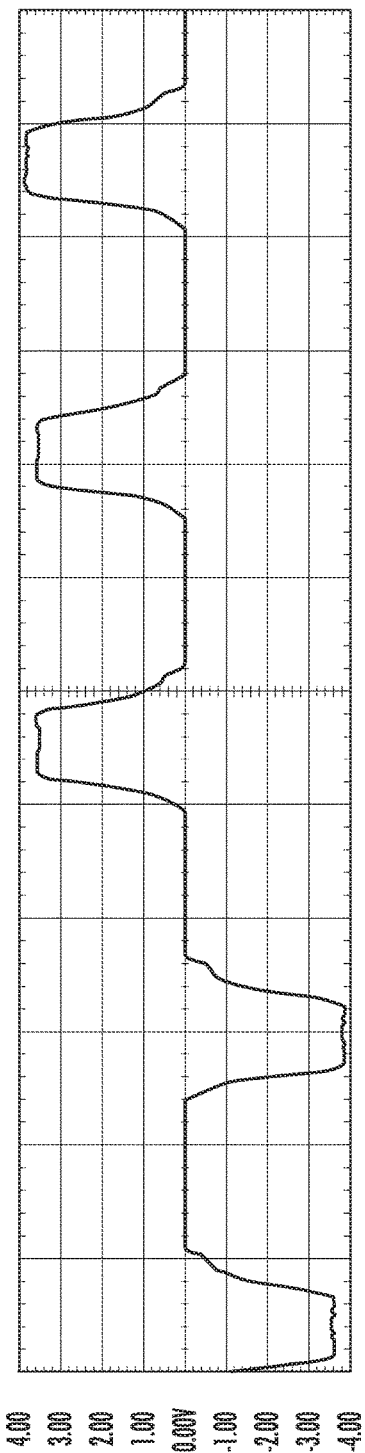
FIG. 3B shows the clamping current waveform supplied by the power supply at the first temperature with a workpiece disposed on the platen.

Line 200 represents the clamping voltage waveform, which does not vary over temperature. However, the clamping current waveform does vary as a function of temperature. Line 210 shows the clamping current waveform at room temperature. FIG. 3A shows the clamping current waveform provided by the power supply 100 to the six electrodes 115, shown in FIG. 1. This waveform is generated without a workpiece disposed on the platen 110. FIG. 3B shows the clamping current waveform provided by the power supply 100 to the six electrodes 115, shown in FIG. 1. This waveform is generated with a workpiece disposed on the platen. These waveforms may represent typical clamping current waveforms when the platen 110 is at a first temperature, such as room temperature.

Figure 4A:
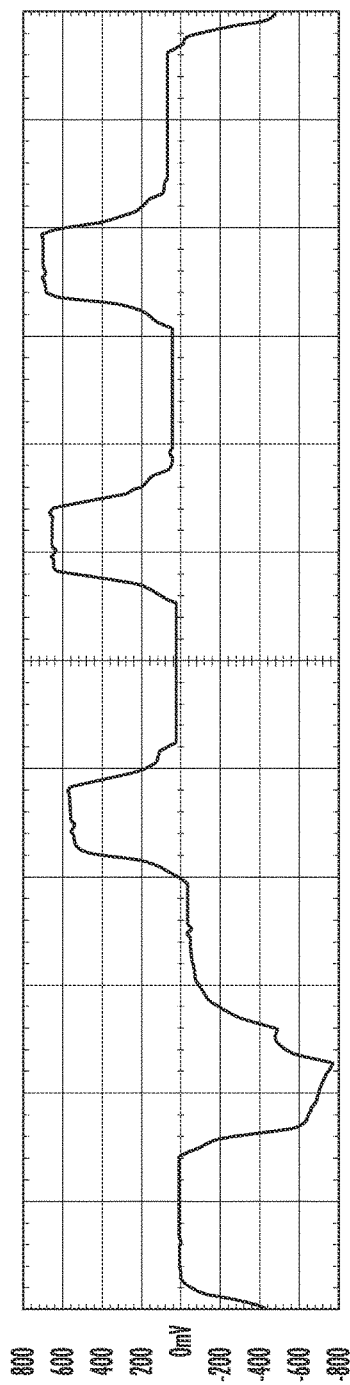
FIG. 4A shows a clamping current waveform supplied by the power supply at a second temperature when there is no workpiece disposed on the platen.
Figure 4B:
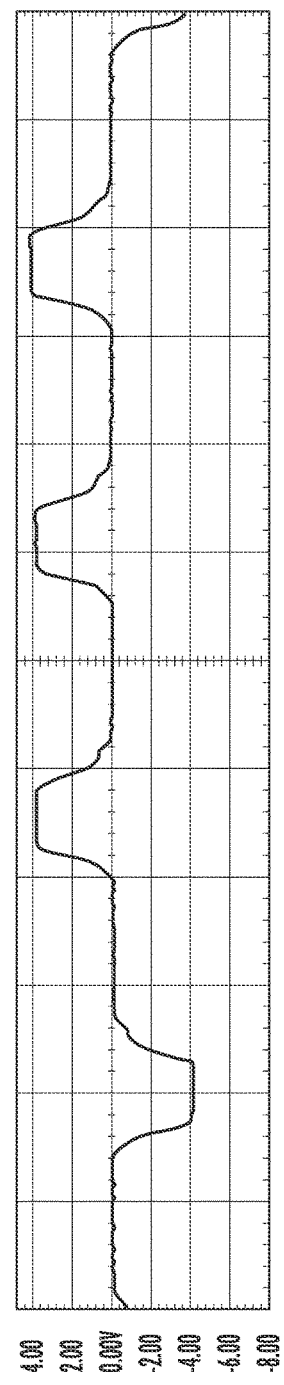
FIG. 4B shows the clamping current waveform supplied by the power supply at the second temperature with a workpiece disposed on the platen.

FIGS. 4A and 4B show the clamping current waveform provided by the power supply 100 to the six electrodes 115, at a second temperature, such as 300° C. The waveform of FIG. 4A is generated without a workpiece disposed on the platen 110. FIG. 4B shows the clamping current waveform provided by the power supply 100 to the six electrodes 115, with a workpiece disposed on the platen 110.

Figure 5A:
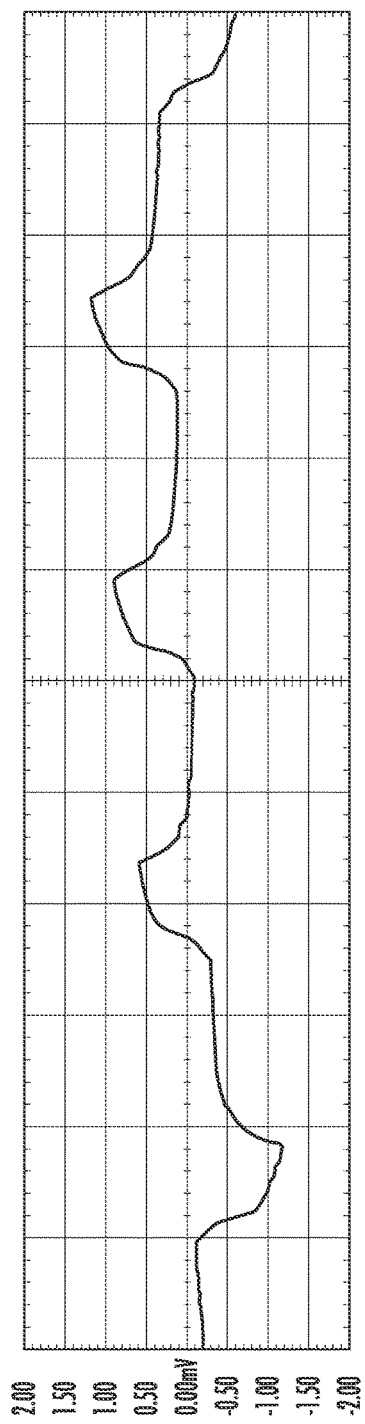
FIG. 5A shows a clamping current waveform supplied by the power supply at a third temperature when there is no workpiece disposed on the platen.
Figure 5B:
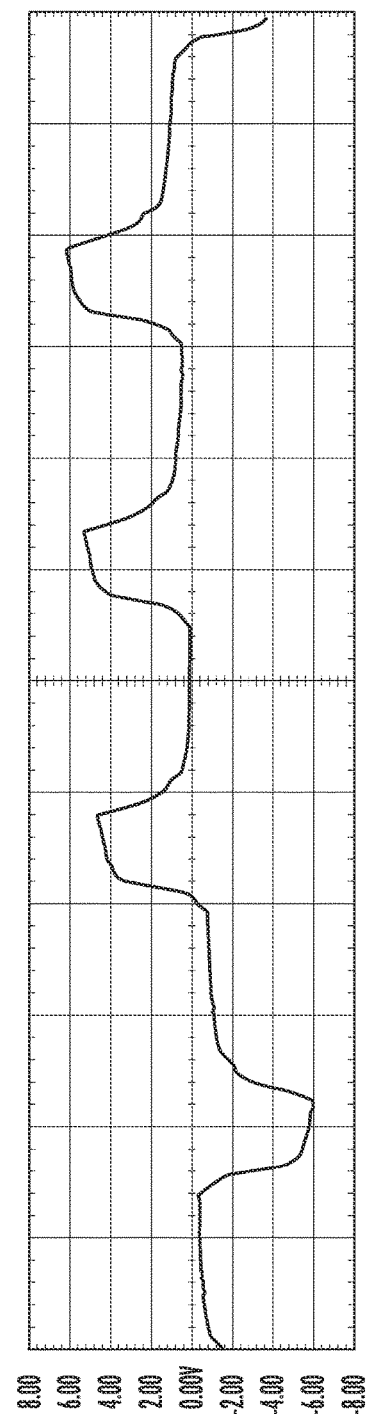
FIG. 5B shows the clamping current waveform supplied by the power supply at the third temperature with a workpiece disposed on the platen.

FIGS. 5A and 5B show the clamping current waveforms provided by the power supply 100 to the six electrodes 115, at a third temperature, such as 500° C. The waveform of FIG. 5A is generated without a workpiece disposed on the platen 110. FIG. 5B shows the clamping current waveform provided by the power supply 100 to the six electrodes 115, with a workpiece disposed on the platen 110.

As can clearly be seen in these figures, the impedance characteristics of the platen 110 have changed, causing noticeable changes to the clamping current waveform. For example, the leading edges of the pulses in the waveforms become more rounded as the temperature increases. In addition, the amplitude and trailing edge of the current waveform also varied with temperature.

Further, it can be seen that the shape of the waveform is also a function of the presence of the workpiece. The shape of the clamping current waveform is clearly affected by the workpiece, as the workpiece affects the total impedance seen by the power supply 100.

As described above, output 101 may be representative of the current supplied to the electrodes 115. While FIGS. 3A-3B, 4A-4B and 5A-5B show a clamping current waveform that is the total clamping current supplied to all electrodes 115, the disclosure is not limited to this embodiment. For example, a clamping current waveform associated with only one electrode or a subset of the electrodes 115 may also be used.

The output 101 is utilized by the controller 130 to determine the temperature of the platen 110 or the workpiece. In a first embodiment, the controller 130 calculates the area under the curve of the clamping current waveform over one or more periods. This may be done using an analog integration circuit, or may be done within the processing unit by using a numerical integration of the area under the curve. The specific method used to calculate the area under the curve of the clamping current waveform is not limited by this disclosure. The calculated area under the curve can then be used to estimate the temperature of the platen and workpiece. In the case where the workpiece is not disposed on the platen, the estimated temperature is that of the platen 110. When the workpiece is disposed on the platen 110, the estimated temperature may be that of the platen, the workpiece, or the combination of these two components. For example, empirical data may be used to convert the calculated area under the curve into a platen temperature and a workpiece temperature.

In one embodiment, the controller 130 uses an equation that converts the calculated area under the curve of the clamping current waveform into a platen or workpiece temperature. This equation may be a polynomial equation, or any other suitable type of expression. In another embodiment, a table is stored in memory device 137. This table includes at least two columns, one column being a list of different values for the area under the curve of the clamping current waveform, and the second column representing the associated platen or workpiece temperature. In certain embodiments, the table may include a third column, where the one column is the list of different values for the area under the curve of the clamping current waveform, a second column represents the platen temperature and the third column represents the workpiece temperature. Of course, other techniques to convert a calculated area under the curve to a platen or workpiece temperature may also be used. For example, in certain embodiments, the area may be calculated based on the absolute value of the clamping current waveform, or the square of the current clamping waveform. Furthermore, the disclosure is not limited to only using area under the curve to determine temperature. For example, an equation or table may be used to convert a different parameter associated with the clamping current to a temperature.

In another embodiment, the controller 130 may perform a Fast Fourier Transform (FFT) on the received output 101. The result is then used to determine the temperature of the platen 110 or workpiece. For example, the frequency components of the clamping current waveform and their magnitudes may vary based on platen and workpiece temperature.

In yet another embodiment, the controller 130 may use other parameters derived from the clamping current waveform to determine the platen and workpiece temperature. These parameters may include, but are not limited to: rise time, fall time, maximum amplitude, phase offset as compared to the clamping voltage waveform, and RMS voltage. Equations or tables, as described above, may be used to perform the conversion of the parameter to a temperature.

In other words, the controller 130 uses one or more parameters of the clamping current waveform to determine the temperature of the platen 110 and workpiece. As described above, this may be possible due to the temperature dependence of the impedance of the platen 110. Further, as described above, the clamping current waveform may be derived from the total clamping current supplied to all of the electrodes 115, a subset of the electrodes 115, or a single electrode.

FIG. 1 shows the power supply 100 as providing the output 101, which is representative of the clamping current, to the controller 130. However, other embodiments are also possible. For example, the current sensor 105 may be external to the power supply 100, and may, for example, be disposed between the power supply 100 and the electrodes 115. The current sensor 105 may provide the clamping current waveform to the controller 130.

In another embodiment, the controller 130 may be disposed within another component of the system. For example, in one embodiment, the controller 130 may be disposed within the power supply 100. In this embodiment, the power supply 100 may provide an output indicative of the platen temperature.

In other words, the configuration of the components shown in FIG. 1 may change. However, in each embodiment, the system includes a power supply 100 to provide a clamping voltage waveform to the electrodes, which are disposed within the platen. Further, in each embodiment, a current sensor 105 is provided. In certain embodiments, like that shown in FIG. 1, the current sensor 105 is disposed within the power supply 100. However, in other embodiments, the current sensor 105 may be disposed outside the power supply 100, such as between the power supply 100 and the electrodes 115. Further, in each embodiment, there is a controller 130 configured to receive the clamping current waveform or a signal representative of the clamping current waveform from the current sensor 105. The controller 130 monitors one or more parameters of the clamping current waveform and derives a platen or workpiece temperature based on these parameters.

Figure 6:
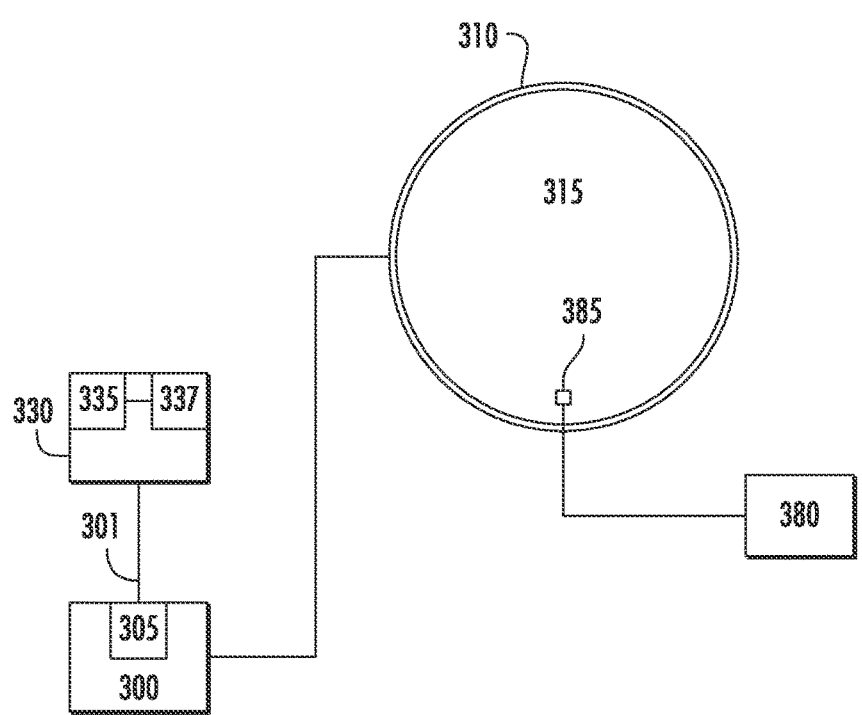
FIG. 6 is a system with in situ temperature monitoring according to a second embodiment.

FIG. 1 shows an embodiment where the clamping voltage is time varying. For this embodiment, the clamping voltage amplitude or frequency may also be varied. However, the disclosure is not limited to this embodiment. In other embodiments, such as that shown in FIG. 6, the clamping voltage may be constant. In this embodiment, one electrode 315 is disposed within the platen 310. The electrode 315 is in communication with a power supply 300. Like the embodiment shown in FIG. 1, the power supply 300 may include a current sensor 305, which provides an output 301 to a controller 330. The controller 330 may include a processing unit 335 in communication with a memory device 337. Like the controller 130 of FIG. 1, the processing unit 335 may be any suitable component, such as a microcontroller, a personal computer, or a specialized device. The memory device 337 may be a non-transitory storage device and may be used to store instructions and data. For example, the instructions to perform the processes described herein may be stored in the memory device 337. In addition, the memory device 337 may include data, tables, algorithms or other formulas to perform the processes described herein.

In this embodiment, the electrode 315 is maintained at a constant clamping voltage. Therefore, the only source of clamping current may be leakage current through the dielectric layer of the platen. It is well known that dielectric materials exhibit greater leakage currents when at elevated temperatures. There are many mechanisms that cause leakage, and therefore, the dependence of leakage current as a function of temperature can vary significantly. As an example, the leakage current of a Johnson-Rahbek dielectric material is a very strong function of temperature. For example, the leakage current of a Coulombic dielectric may display no change from room temperature to a first elevated temperature, such as but not limited to 300° C., as the transition temperature is a function of material, platen design and platen fabrication, and then increase slowly as the temperature goes from this first temperature to 500° C. and beyond.

For each dielectric material used to manufacture platens, it is possible to calibrate leakage behavior to dielectric temperature empirically. This leakage current can be measured with an ammeter in the case of a constant clamping voltage waveform. This leakage current may then be correlated to platen and workpiece temperature.

Thus, the controller 330 receives an output 301 from the current sensor 305. This output may be the clamping current waveform, as described with respect to the previous figures. In another embodiment, the output 301 may simply be an indication of the leakage current measured by the current sensor 305. Since the clamping voltage is constant, the leakage current may also be relatively constant. For example, in this embodiment, the output 301 may be a digital value that represents the leakage current. Alternatively, the output 301 may be an analog voltage that is representative of the leakage current.

Like the embodiment shown in FIG. 1, the controller 330 may convert this output 301 to a platen or workpiece temperature. This may be done using an equation or a table, as described above.

Heating system 380 may be responsible for supplying a current to heating elements 385 disposed in or near the platen 310. These heating elements are used to heat the platen 310 to a desired temperature. Typically, the current supplied to the heating elements is based on a table or another source of empirical data.

In certain embodiments, platens may have different clamping waveform parameters, depending on the dielectric materials used in their construction. In certain embodiments, the controller 130, 330 may also include additional information into the calculation of platen or workpiece temperature. For example, an ion implantation system may use different platens, which may be supplied by different manufacturers. Each platen from a single manufacturer may have similar impedance characteristics; however, impedance characteristics may vary between manufacturers. Thus, in certain embodiments, the controller 130, 330 may also receive information regarding the type of the platen. The type of the platen may include information such as model number, manufacturer, date of manufacture, or other data related to the platen. The table or algorithm used by the controller 130, 330 may change based on this information.

Additionally, as seen in FIGS. 3A-3B, 4A-4B and 5A-5B, the impedance characteristics of the platen also vary depending on whether a workpiece is disposed on the platen. In other words, a platen may produce a different clamping current waveform if a workpiece is disposed thereon. Thus, the controller 130, 330 may also be provided this information and use this information to determine the temperature of the platen and the workpiece.

In summary, the controller 130, 330 may use various data to determine the platen and workpiece temperature. This data may include the design of platen, the manufacturer and model of the platen; the clamping current waveform or an output indicative of that clamping current waveform; degradation of platen temperature performance and whether a workpiece is disposed on the platen. Using this information, the controller 130, 330 can determine the temperature of the platen 110, 310 or the workpiece.

Figure 7:
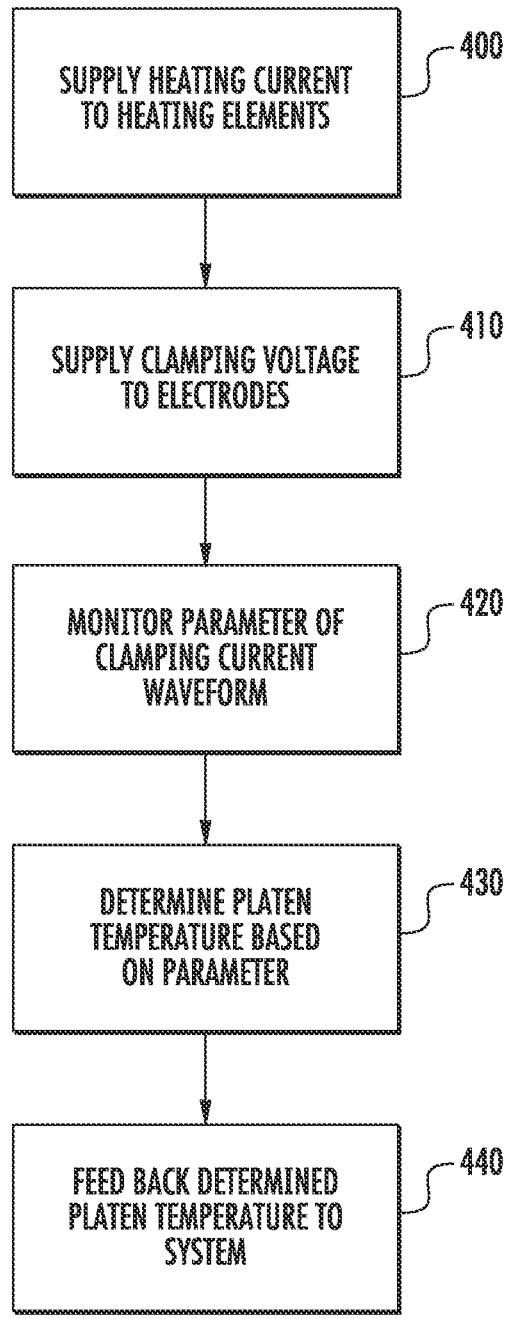
FIG. 7 shows a flowchart showing operation of the system according to one embodiment.

Once the temperature of the platen and workpiece have been determined by the controller, this information may be used in a plurality of ways. FIG. 7 is a flowchart showing one embodiment in which the temperature calculated by the controller is used in the system. First, as shown in Process 400, a heating current is supplied to one or more heating elements disposed in or near the platen to set the desired temperature of the platen. The power supply 100, 300 then supplies a clamping voltage to the electrodes 115, 315 disposed in the platen 110, 310, as shown in Process 410. This clamping voltage is used to create an electrostatic force that holds the workpiece on the platen 110, 310. The controller 130, 330 then monitors a parameter of the clamping current waveform, as shown in Process 420. This parameter may be area under the curve, rise time, phase offset, frequency content, amplitude, or another parameter. Based on the monitored parameter, the controller 130, 330 determines the temperature of the platen 110, 310, as shown in Process 430. As explained above, the controller may also use other information, such as the type of the platen, such as model number and manufacturer, and the existence of a workpiece on the platen to determine the temperature of the platen. The determined temperature is then fed back to the system, as shown in Process 440. In one embodiment, the temperature information is relayed to the heating system 180, 380 responsible for heating the platen so as to provide feedback to that heating system. This feedback can be used by the heating system 180, 380 to control the temperature ramp up, ramp down and soak times to mitigate potential platen damage. In another embodiment, the temperature information is used to form a feedback loop with the heating system 180, 380 to maintain the temperature of the platen within a desired temperature range. In yet another embodiment, the temperature information may be used to detect impending failures. For example, if the difference between the desired temperature, as set by the heating system 180, 380, and the determined temperature is too great, this may be indicative of a failure or an impending failure. Of course, the calculated temperature may also be used for other purposes, which are not limited by this disclosure.

The embodiments described above in the present application can have many advantages. First, the present system is able to measure the temperature of the platen or workpiece in situ, while an implant is actually occurring. Because the system uses clamping current to determine platen and workpiece temperature, there are no external temperature sensors, or imaging cameras. Second, the monitoring of the temperature does not affect the implant process. Again, the present system uses the clamping current waveform to determine the platen and workpiece temperature. Monitoring this clamping current does not affect the platen or workpiece temperature. Additionally, the present system allows continuous temperature monitoring before, during and after ion implanting. This may be used to control ramping up or ramping down the temperature of the platen or the workpiece, mitigate potential failures or to achieve desired semiconductor device characteristics. The measured temperature can also be compared to the desired or expected temperature to detect an impending failure, which may result in earlier detection and remediation of a problem.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system for determining a temperature of a platen, comprising:
   the platen comprising at least one electrode;
   a power supply to provide a clamping voltage and a clamping current to the at least one electrode, wherein the clamping voltage creates an electrical field that serves to clamp a workpiece to the platen;
   a current sensor to monitor the clamping current; and
   a controller configured to determine a temperature of the platen based on a parameter of the clamping current.

2. The system of claim 1, wherein the clamping voltage is a time-varying voltage.

3. The system of claim 2, wherein the current sensor outputs a clamping current waveform to the controller.

4. The system of claim 3, wherein the parameter comprises an area under a curve of the clamping current waveform.

5. The system of claim 1, wherein the controller is further configured to determine the temperature of the platen in response to a type of the platen.

6. The system of claim 1, wherein the clamping voltage is a constant voltage.

7. The system of claim 6, wherein the parameter comprises a measure of a leakage current through a dielectric layer of the platen.

8. The system of claim 1, wherein the current sensor is disposed within the power supply.

9. The system of claim 1, wherein the controller is further configured to determine the temperature of the platen based on the parameter and an equation, wherein the equation converts the parameter to the temperature of the platen.

10. The system of claim 1, wherein the controller is further configured to determine the temperature of the platen based on the parameter and data stored in a table, where the table comprises a plurality of values of the parameter and temperature values corresponding to the plurality of values.

11. The system of claim 1, wherein the controller is further configured to determine the temperature of the workpiece disposed on the platen, based on the parameter and data stored in a table, where the table comprises a plurality of values of the parameter and temperature values corresponding to the plurality of values.

12. The system of claim 1, further comprising a heating system to heat the platen, wherein the temperature determined by the controller is used to modify an operation of the heating system in situ to optimize the temperature of the platen.

* * * * *